(12) United States Patent
Parks

(10) Patent No.: US 7,690,329 B2
(45) Date of Patent: Apr. 6, 2010

(54) PORTABLE WATER CONTAINER AND DRINKING BOWL FOR PETS

(75) Inventor: Linda Parks, Napa, CA (US)

(73) Assignee: Lixit Corporation, Napa, CA (US)

( * ) Notice: Subject to any disclaimer, the term of this patent is extended or adjusted under 35 U.S.C. 154(b) by 157 days.

(21) Appl. No.: 12/004,832

(22) Filed: Dec. 21, 2007

(65) Prior Publication Data

US 2009/0159009 A1 Jun. 25, 2009

(51) Int. Cl.
*A01K 7/00* (2006.01)
(52) U.S. Cl. ............... 119/74; 119/72; 215/395
(58) Field of Classification Search ........... 119/51.5, 119/52.1, 74, 77; 220/574, 23.2, 23.83, 23.86; 215/395; D30/121, 129, 132; 206/217, 218, 206/547
See application file for complete search history.

(56) References Cited

U.S. PATENT DOCUMENTS

| | | | |
|---|---|---|---|
| 1,431,472 A | | 10/1922 | Liggett |
| 2,177,758 A | * | 10/1939 | Voke ........................ 222/492 |
| 2,874,678 A | | 2/1959 | Bradley |
| 3,907,172 A | * | 9/1975 | Curtis .................. 222/189.07 |
| 4,450,790 A | | 5/1984 | Stansbury, Jr. |
| 5,328,069 A | * | 7/1994 | Cohanfard ............... 224/148.2 |
| 5,467,735 A | | 11/1995 | Chrisco |
| 5,535,889 A | * | 7/1996 | Lin ........................... 206/546 |
| 5,636,592 A | * | 6/1997 | Wechsler ................... 119/52.1 |
| 5,810,194 A | * | 9/1998 | Samsel ....................... 220/574 |
| 5,960,742 A | * | 10/1999 | O'Rourke et al. ............. 119/74 |
| D468,489 S | | 1/2003 | Wechsler |
| 6,718,911 B2 | | 4/2004 | Greenberg |
| 2002/0148852 A1 | * | 10/2002 | Schultz ......................... 222/78 |
| 2007/0017452 A1 | * | 1/2007 | Hurwitz et al. ............... 119/74 |
| 2007/0079762 A1 | * | 4/2007 | Stephanos .................... 119/74 |

* cited by examiner

*Primary Examiner*—Kimberly S Smith
*Assistant Examiner*—Danielle Bates
(74) *Attorney, Agent, or Firm*—Harris Zimmerman; Howard Cohen

(57) ABSTRACT

A combination liquid container and pet drinking bowl in which the bowl is formed of a plastic sheet secured to the container. The sheet may be flexed into two distinct positions. In a first stored position, the sheet is form-retaining and lies against a portion of the container. In a second operative position, the sheet provides a form-retaining bowl extending longitudinally from the container and may be filled with liquid from said container.

10 Claims, 2 Drawing Sheets

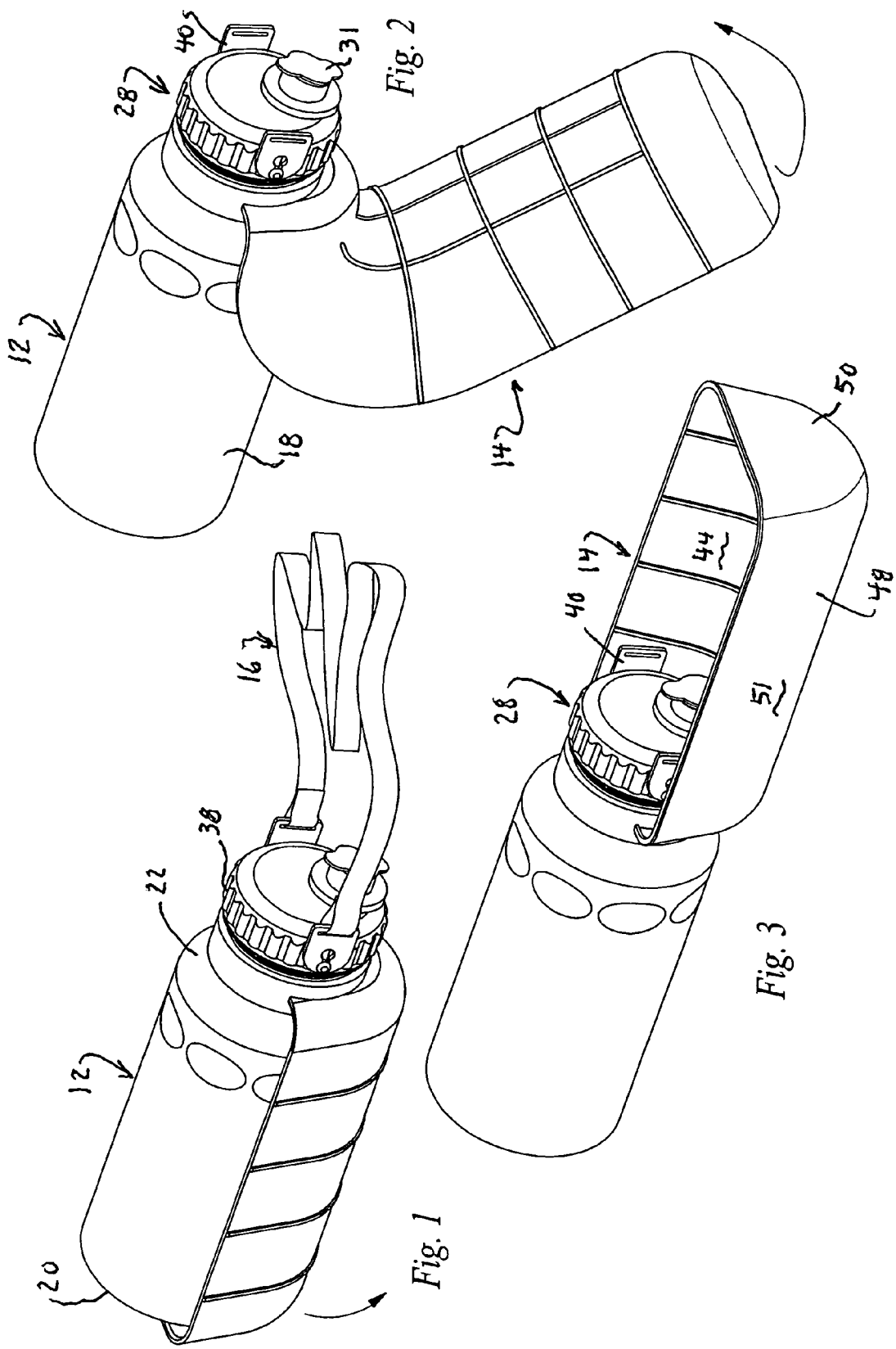

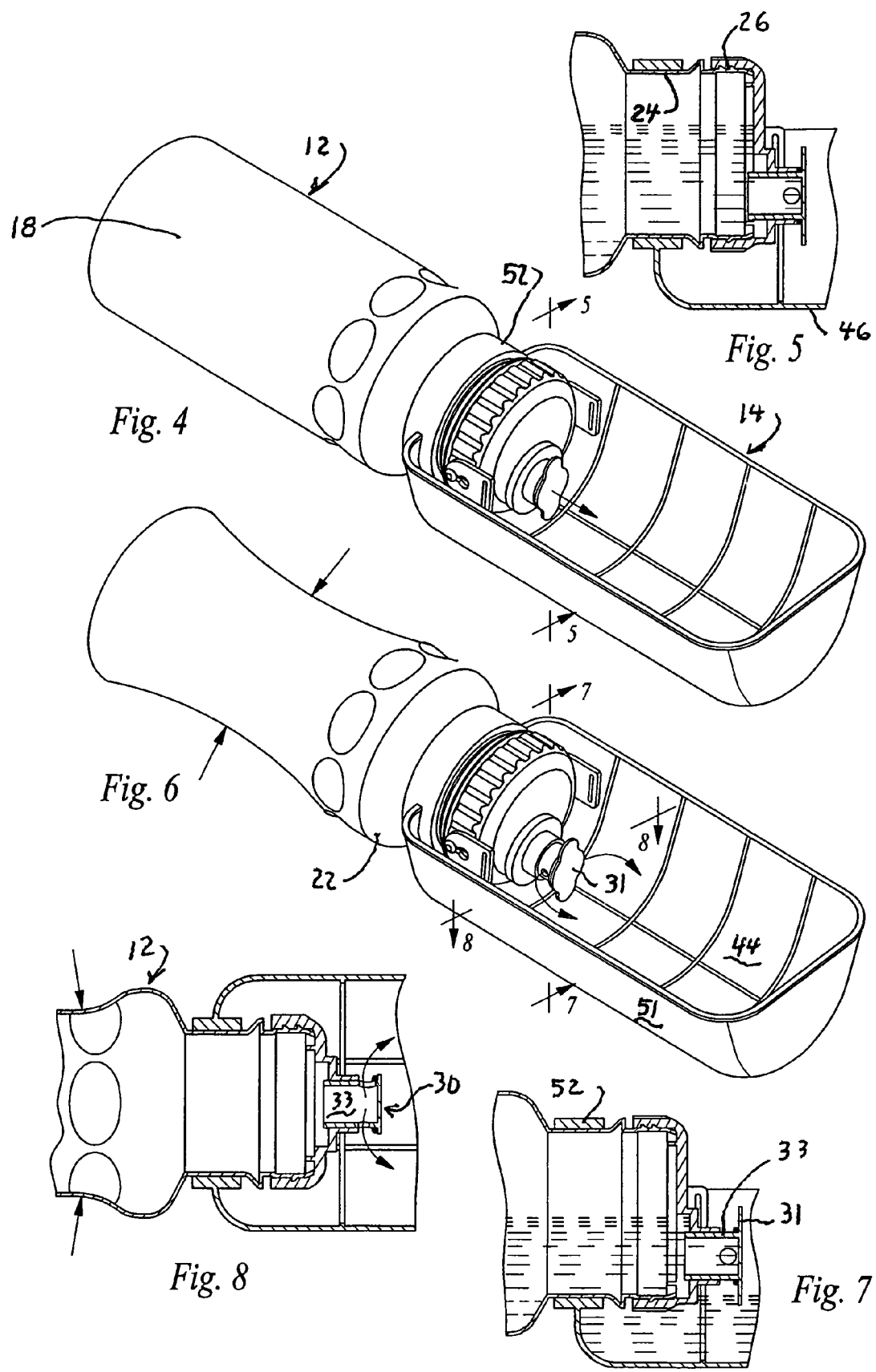

PORTABLE WATER CONTAINER AND DRINKING BOWL FOR PETS

CROSS-REFERENCE TO RELATED APPLICATIONS

Not applicable.

FEDERALLY FUNDED RESEARCH

Not applicable.

SEQUENCE LISTING, ETC. ON CD

Not applicable.

BACKGROUND OF THE INVENTION

1. Field of the Invention

This invention generally relates to watering devices for dogs or other pets. More particularly, this invention relates to a device which incorporates a water container or reservoir having a pet drinking bowl or trough attached to the container and moveable between one inoperative or stored position encompassing at least a portion of the container and a second operative position extending from the container and defining a trough or reservoir into which water from the container may flow, and from which the dog or other pet may drink.

In its stored or inoperative position, the device may be easily carried by the pet owner who can then readily move the bowl and the container between their operative and inoperative positions.

2. Description of Related Art

A number of patents have been granted on the concept of combining a pet drinking bowl with a water container, which allows the pet owner to transfer water from the container into the bowl when the dog or other pet needs to drink from the bowl. The products disclosed in some of these patents are available for purchase by the pet owner, and in some instances incorporate a pivot connection between the bowl and the container. This permits the bowl and container to be moved between a folded inoperative position for carrying the bowl to an unfolded operative position wherein water from the container may be transferred into the bowl. Such pivotal movement is typically effected by the use of a pivot pin connecting one end of a longitudinally extending preformed bowl having a generally semi-circular cross-section to an end portion of a generally cylindrical water container. Such end portion may contain a valve so that water may flow into the container when the bowl is in its operative position with its longitudinal axis extending away from the longitudinal axis of the container. In its inoperative or folded position, the inner bowl surface is complementary to and overlies a generally semi-cylindrical portion of the container.

BRIEF SUMMARY OF THE INVENTION

In accordance with the teachings of the present invention, a pivotal connection is made between the bowl and the container without the use of a conventional pivot pin. Instead, the bowl is formed of flexible material and is provided with an integral portion which may be connected to a container adjacent the discharge end thereof for movement between the operative and inoperative positions of the bowl and container. Notwithstanding the flexible characteristics of the bowl, the material forming the bowl is form retaining in two different positions. The first position is when one surface of the bowl member may receive and hold water disbursed from the container and is of trough-like configuration, permitting a pet to drink from the same. The second position is that when the bowl member is manually deformed about its longitudinal axis so that the said one surface of the bowl effectively becomes the outer surface of the member, and upon rotation of said member about a transverse axis, said one surface will retain its trough-like configuration, but will be in adjacent or nesting relationship to the container.

In each position of the bowl member, the member is form retaining to either provide a watering trough for the pet, or a semi-enclosure for the container which adds only the thickness of the bowl material to the overall size of the combined container and bowl.

It should be noted that the water retaining inner surface of the bowl member, which may be engaged by the tongue of the pet in lapping up water in the trough formed by such member, becomes the outer exposed surface of the parts in their folded or inoperative position. Accordingly, such inner surface and any bacteria on the same will be exposed to the atmosphere rather than disposed between the closely adjacent surfaces of the container and bowl.

BRIEF DESCRIPTION OF THE DRAWINGS

FIG. 1 is a perspective view of the parts in their folded or closed inoperative position with a strap for carrying the device.

FIG. 2 is a perspective view similar to FIG. 1, with the bowl portion as it is moving between its operative and inoperative positions, partially rotated about a transverse axis, but prior to its rotation about a central longitudinal axis.

FIG. 3 is another perspective view with the parts in their unfolded operative positions, i.e., with the longitudinal axes of the container and the bowl being generally aligned.

FIG. 4 is a view similar to FIG. 3, but from a slightly different perspective showing the valve mechanism for transferring water or other liquid from the container into the trough in its closed condition.

FIG. 5 is a cross-sectional view taken in the plane indicated by line 5-5 of FIG. 4.

FIG. 6 is a view similar to FIG. 4, but showing the valve mechanism in its open condition.

FIG. 7 is a cross-sectional view taken in the plane indicated by line 7-7 of FIG. 6.

FIG. 8 is a sectional view taken in the plane indicated by line 8-8 of FIG. 6.

DETAILED DESCRIPTION OF THE INVENTION

In broad terms, the device of the present invention generally includes a container 12 for holding a quantity of water or other liquid, a bowl member 14 from which a pet may drink, and a carrying strap 16 by means of which the device may be easily carried by the pet owner as his or her dog or other pet is being walked. As previously explained or suggested, the bowl member 14 in its folded or inoperative position nestles with and its length is substantially coextensive with the length of the container 12 as shown in FIG. 1. FIG. 1 illustrates the relative inoperative portions of the parts when the device is stored or is being carried by the pet owner.

Container 12 is of generally conventional design having substantially cylindrical side walls 18, a bottom wall 20, an inwardly tapered wall portion 22 near the upper open end of the container, a short cylindrical neck portion 24, followed by an externally threaded portion 26 immediately adjacent the open end of the container.

An internally threaded closure or cap 28 may be screwed on portion 26 to retain liquid previously poured into the container. When the pet wants a drink, and the bowl 14 is in its operative position as shown in FIGS. 4 and 6, it would be possible to unscrew cap 28 and permit water to flow from the container 12 into the bowl, possibly facilitated by squeezing container 12 as indicated by the arrows in FIG. 6. A better control of water flow is accomplished by providing a valve 30 at the top of the cap. The valve may comprise a short tube 32 extending through the cap. A plug 33 slides in the tube 32 and is provided with one or more side discharge apertures adjacent its distal end. A manually engageable flap 31 is attached to plug 33 for pulling the same outwardly from tube 32 and providing flow communication between the contents of the container and the bowl, for filling the same with water. Tilting the combined container and bowl may also assist in the flow of water into the bowl when the valve is in its open position.

Cap 28 includes a cylindrical internally threaded flange 38 portion for selectively opening and closing the container. The outer surface of such flange portion may be roughened or provided with ribs to facilitate manual rotation of the cap. The cap is also provided with a pair of pivotally attached diametrically spaced ears 40 whose distal ends are slotted for receiving the strap 16. The strap may be used when the parts are in their operative or inoperative positions. However, under most circumstances the unit would be carried by the strap when the parts are in their folded or inoperative positions.

With reference to bowl 14, it is preferably made of an integral sheet of plastic material, flexible, yet capable of being form retaining in at least two positions. While PVC has the general desired qualities, it is believed that ethylene vinyl acetate copolymer (EVA) is the preferred plastic, particularly since it is disposable. EV 260 is the plastic used in creating models embodying the present invention. The sheet in one of its form-retaining positions is illustrated in FIGS. 3, 4, and 6, wherein it defines a generally semi-cylindrical bowl extending outwardly from the closed end of container 12 and with its axis generally longitudinally coaxial with the axis of the cylindrical container. Bowl 14, as shown, has a ribbed inner surface 44 defining a bottom wall 46, side walls 48, and a semi-circular distal end wall 50 disposed generally perpendicular to side walls 48. The proximal end portion of the sheet is provided with an integral collar 52 which may be forcibly positioned over the neck portion 24 of the container 18. Collar 52 is of generally cylindrical configuration and will remain in locked position on the container during subsequent movement of the bowl sheet, which will be presently described. Collar 52 serves as the anchor for the pivoting or deforming of the sheet during movement between its two major fixed positions.

Side walls 48 have upper edges 49 which extend slightly above the horizontal plane including the longitudinal axis of the bowl.

In its operative extended position shown in FIGS. 3, 4, and 6, a user can pick up container 12 with one hand and the bowl 14 is supported in a cantilever fashion by collar 52 with the bowl facing upwardly. As previously explained, the user may then open the discharge valve in the cap member by pulling valve tube 32 outwardly and permitting water to freely flow from the container to a proximal portion of bowl 14, squeezing the flexible walls of the container to expedite the flow of liquid through the valve.

After the pet has completed drinking the water or other liquid from the bowl, any excess water may be poured out of the bowl. The sheet forming the bowl is then ready for flexing into its second, or folded inoperative position. It is the relative movement of the bowl relative to the container, or more specifically the flexing of the sheet which puts the bowl into its two fixed positions.

Assuming the bowl is in its operative position shown in FIG. 3, the user may hold the container 12 in his or her hand and push the bowl 14 in a generally clockwise direction. Collar 52 will remain stationary on the container 12, and as the bowl sheet continues its movement, the outer surface 51 of side walls 48 will commence engaging the outer surface of container 12 as generally indicated in FIG. 2. Continued movement of the bowl member causes further portions of said side walls to come into contact with the outer surface of container 12. The end portions of the bowl side walls, together with end wall 50 are then flexed about a transverse axis causing the entire outer surface 51 of the bowl, including the outer surface of end wall 50 to fold into place around slightly more than half the diameter of the container and its bottom or end wall 20, all as shown in FIG. 1 of the drawings. The so-called inner surface 44 of the bowl now becomes exposed and becomes the outer surface for the folded container and bowl combination as shown in FIG. 1. This will permit germs or bacteria formed on the drinking or lapping surface and exposed for cleaning, such as by holding the same under a faucet or hose. In the folded position, it is easy for the user to remove cap 28 for discharging any stale water in the container or for rinsing and refilling the container with fresh water.

While the preferred embodiment of the invention is disclosed and described in the drawings and in the specification, it should be understood that various modifications and embodiments may be made within the scope of the following claims.

The invention claimed is:

1. A combination liquid container and drinking bowl for pets comprising a generally cylindrical container having side walls, a bottom wall, and an open top, a cap for selectively opening and closing said top, a valve member in said cap through which liquid may be dispensed through said member when the valve is opened and liquid is sealed in said container when the valve is closed; a bowl member comprising a generally homogeneous sheet of plastic material secured to said container adjacent said open top, said sheet being flexed into a first position overlying and substantially covering a generally semi-circular portion of said container and being form-retaining in said first position, said sheet being flexible to assume a second position providing a substantially semi-cylindrical bowl with its longitudinal axis being generally coaxial with and extending from the axis of said container, and said sheet being form-retaining in said second position.

2. The apparatus of claim 1 in which said sheet in said second position extends longitudinally from adjacent said top of said container.

3. Apparatus as set forth in claim 1 in which plastic material consists of ethylene vinyl acetate copolymer.

4. Apparatus as set forth in claim 1 in which the surface of said sheet which forms the inner surface of said bowl member when said sheet is in said second position becomes the outer surface of said sheet when the latter is in said first position.

5. Apparatus as set forth in claim 1 in which said valve member is disposed in the cavity defining said bowl member when said sheet is in said second position.

6. Apparatus as set forth in claim 1 in which said cap includes a central aperture, and said valve member has a cylindrical plug axially slidable in said aperture, said plug having an opening adjacent one end thereof, said opening providing a passage between said container and said bowl in one position of said plug, and closing said passage in another position of said plug.

7. Apparatus as set forth in claim 6 in which said plug has a manually engageable element for moving said plug.

8. Apparatus as set forth in claim 1 including a strap for carrying said container and said bowl.

9. Apparatus as set forth in claim 8 in which said strap is pivotally connected to said cap.

10. Apparatus as set forth in claim 1 in which said container has a diametrically restricted neck portion adjacent said open top, and said sheet is provided with an integral collar engaging said neck portion for securing said sheet to said container.

* * * * *